(12) United States Patent  (10) Patent No.: US 8,801,826 B2
Jarrier  (45) Date of Paten: Aug. 12, 2014

(54) PRE-FILTER OR COALESCER MOUNTED ON PULSE CARTRIDGE TRIPOD

(75) Inventor: Etienne Rene Pascal Jarrier, Basingstoke (GB)

(73) Assignee: BHA Altair, LLC, Franklin, TN (US)

(*) Notice: Subject to any disclaimer, the term of this patent is extended or adjusted under 35 U.S.C. 154(b) by 139 days.

(21) Appl. No.: 13/417,358

(22) Filed: Mar. 12, 2012

(65) Prior Publication Data

US 2013/0232932 A1 Sep. 12, 2013

(51) Int. Cl.
*B01D 46/00* (2006.01)
(52) U.S. Cl.
USPC .................. 55/482; 55/284; 55/309; 55/312; 55/341.1; 55/483
(58) Field of Classification Search
CPC ........ B01D 46/02; B01D 46/10; B01D 46/12; B01D 46/23–46/24
USPC ........ 55/482–483, 283–284, 302, 341.1, 309, 55/312; 95/280, 286; 96/421, 420, 134
See application file for complete search history.

(56) References Cited

U.S. PATENT DOCUMENTS

| 6,974,490 B2* | 12/2005 | Gillingham et al. ............ 55/486 |
| 2003/0192432 A1* | 10/2003 | Gubler ........................... 95/280 |
| 2011/0083419 A1* | 4/2011 | Upadhyay et al. .............. 60/264 |

* cited by examiner

*Primary Examiner* — Jason M Greene
*Assistant Examiner* — Karla Hawkins
(74) *Attorney, Agent, or Firm* — Reinhart Boerner Van Deuren s.c.

(57) ABSTRACT

A filter arrangement is provided for filtering fluid flow in a turbine inlet system. The filter arrangement includes a support structure extending along an elongated axis within the turbine inlet system. A pulse or static cartridge filter for filtering a fluid flow is mounted on the support structure, with the support structure extending from an end of the cartridge filter. A pre-filter for filtering and/or coalescing the fluid flow is provided and is supported by the cartridge filter. A method of filtering fluid flow in the turbine inlet system is also provided.

20 Claims, 5 Drawing Sheets

PRE-FILTER OR COALESCER MOUNTED ON PULSE CARTRIDGE TRIPOD

BACKGROUND OF THE INVENTION

1. Field of the Invention

The invention relates to a filter arrangement and, more particularly, to a pre-filter supported by a cartridge filter within a turbine inlet system.

2. Discussion of Prior Art

Filter elements are typically incorporated in turbine inlet systems for filtering entering fluid flow. Filter elements can include both pre-filters for filtering/coalescing the entering fluid flow and also cartridge filters to further filter the fluid flow. Pre-filters are often mounted inside a weather hood of the turbine inlet system. However, retrofitting pre-filters in a turbine inlet system can be complicated and expensive because the pre-filters often require extra brackets and/or holding frames for holding the pre-filters in place. Moreover, the installation and replacement of the pre-filters in the weather hoods can be time consuming, thus putting the turbine inlet system out of service for a period of time. Accordingly, it would be beneficial to provide a pre-filter that does not require a frame and that is quickly removable/replaceable. It would also be beneficial to provide a pre-filter that can be easily retrofitted into an existing inlet system, such that the pre-filter could be used in multiple, different turbine inlet systems.

BRIEF DESCRIPTION OF THE INVENTION

The following is a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

In accordance with one aspect, the present invention provides a filter arrangement for filtering fluid flow in a turbine inlet system. The filter arrangement includes a cartridge filter positioned within a filter section of the inlet system. The filter arrangement further includes a pre-filter for filtering and/or coalescing the fluid flow, the pre-filter being supported by the cartridge filter.

In accordance with another aspect, the present invention provides a filter arrangement for filtering fluid flow in a turbine inlet system. The filter arrangement includes a cartridge filter mounted on a support structure, and a pre-filter for filtering and/or coalescing the fluid flow. The pre-filter includes a pre-filter supporting means for attaching the pre-filter to the cartridge filter.

In accordance with another aspect, the present invention provides a method of providing a filter arrangement for filtering fluid flow in a turbine inlet system. The method includes positioning a cartridge filter within a filter section of the inlet system. The method includes supporting a pre-filter, which filters the fluid flow, upon the cartridge filter.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
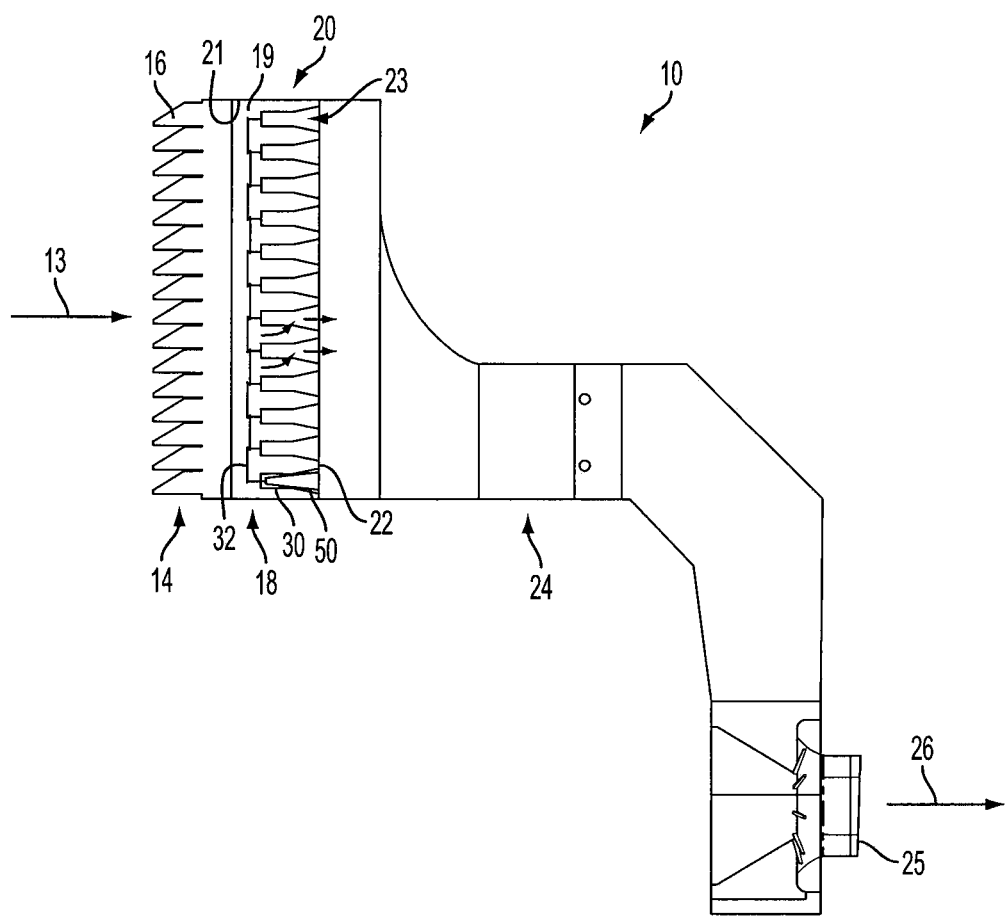
FIG. 1 is a schematized cross-section view of an example inlet system including an example filter arrangement in accordance with an aspect of the present invention.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

FIG. 1 illustrates an example turbine inlet system 10 for delivering a fluid flow to a device, such as a gas turbine. In short summary, a fluid flow 13 is drawn from an exterior location, through an inlet sections 14 and into the turbine inlet system 10. Within the turbine inlet system 10, the fluid flow 13 enters a filter section 18 and passes through a filter arrangement 20 located within the filter section. The filter arrangement 20 can include one or more pre-filters 32 supported by one or more cartridge filters 30 in accordance with an aspect of the present invention. The fluid flow 13 is initially filtered by the pre-filters 32 and then filtered by the cartridge filters 30. The fluid flow 13 can then pass through an outlet section 24 and exit the turbine inlet system 10 through an outlet 25.

It should be appreciated that the inlet section 14 is somewhat generically shown within FIG. 1. This generic representation is intended to convey the concept that the inlet section 14 of the turbine inlet system 10 shown in FIG. 1 can represent a prior art construction or a construction in accordance with one or more aspects of the present invention as will be described below. The inlet section 14 is positioned at an upstream location of the turbine inlet system 10 and defines an open area through which the fluid flow 13 can enter the turbine inlet system 10. As is generally known, the inlet section 14 can include one or more hoods 16 for providing a shielding function to help protect the turbine inlet system 10 from ingesting at least some materials and/or precipitation. Examples of such materials that the hoods 16 shield from ingestion include, but are not limited to, leaves, branches, animals, dust, particulates, etc. The hoods 16 extend outwardly from the inlet section 14.

The filter section 18 is positioned adjacent to and downstream from the inlet section 14. The filter section 18 is in fluid communication with the inlet section 14, such that the filter section 18 receives the fluid flow 13 from the inlet section 14. The filter section 18 defines a chamber 19 that includes a substantially open area. The chamber 19 can be substantially hollow such that fluid flow, including air, can enter and flow through the chamber 19.

Turning to the filter arrangement 20 at the filter section 18, the filter arrangement can be considered to include the pre-filters 32 and the cartridge filters 30. As will be described below, the pre-filters 32 and cartridge filters 30 each function to filter the fluid flow 13 that passes through the filter section 18. The filter arrangement 20 is attached to a partition 22 that is positioned at a downstream location of the filter section 18. The partition 22 can include a substantially vertically oriented wall that extends transverse to the filter section 18 in a direction substantially perpendicular to a fluid flow direction. The partition 22 extends between a bottom wall and a top wall, and between opposing sidewalls of the filter section 18. The partition 22 can include one or more apertures 23 through which filtered fluid flow passes through and exits the filter section 18. Surrounding the apertures 23, the partition 22 is a non-porous structure, such that fluid flow can only occur through the apertures 23. After exiting the filter section 18, the fluid flow passes through the outlet section 24 and through the outlet 25, whereupon the fluid flow exits the outlet 25 as an exiting fluid flow 26, which can be utilized (e.g., within the gas turbine) as will be appreciated.

Figure 2:
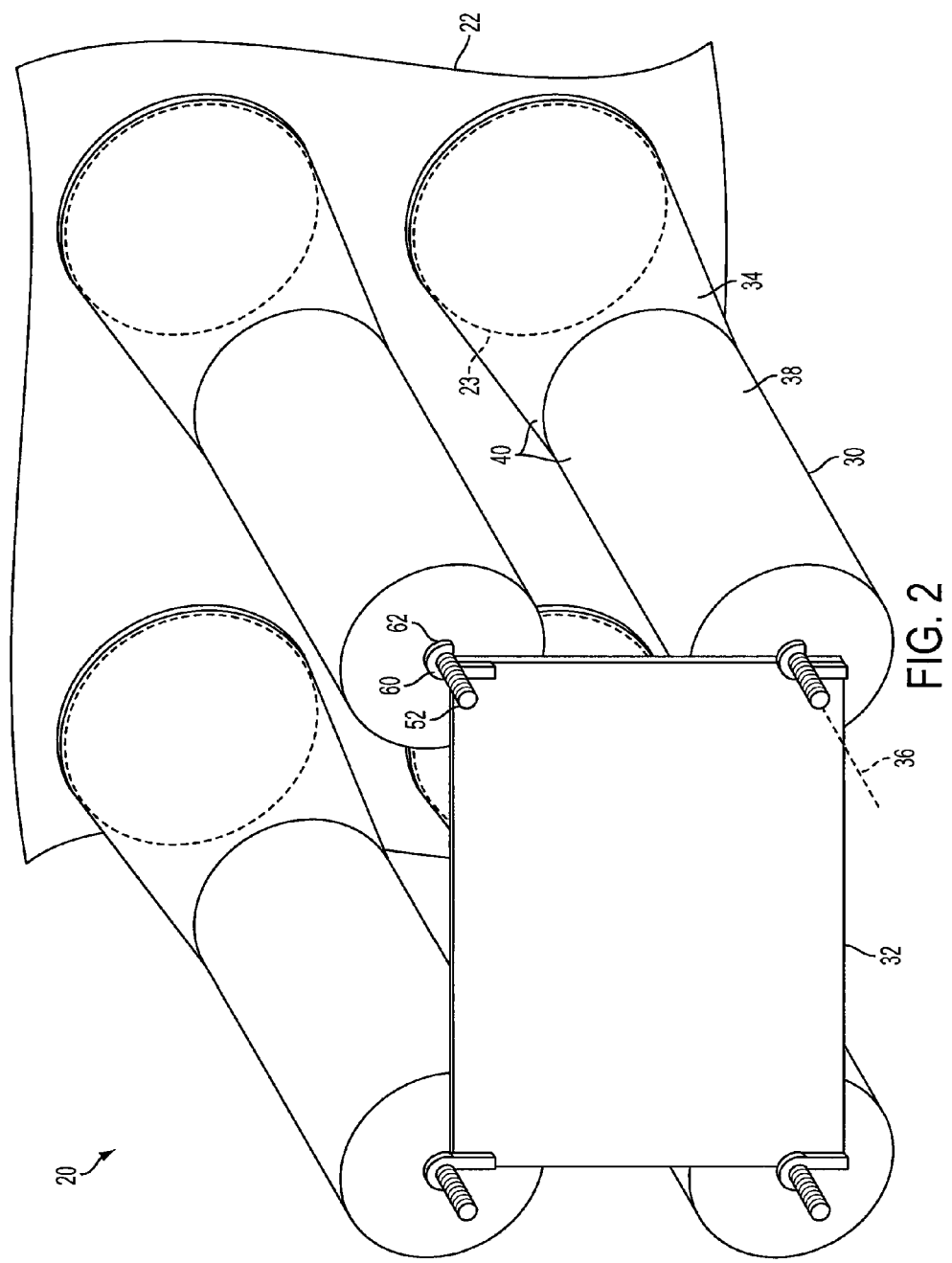
FIG. 2 is a perspective view of a portion of the example filter arrangement including an example pre-filter supported on at least one cartridge filter in accordance with an aspect of the present invention.

Referring to FIG. 2, one example of the filter arrangement 20 is shown in more detail. The filter arrangement 20 includes a plurality of cartridge filters 30 positioned within the filter section 18. It is to be appreciated that FIG. 2 may be considered as depicting only a portion of the filter arrangement 20 (e.g., a portion of a larger filter array). Indeed, while four cartridge filters are shown in FIG. 2, it is to be understood that the filter arrangement 20 can include more cartridge filters within a large array. The partition 22 would be sized accordingly and provided with a corresponding number of apertures 23. Additional cartridge filters within a larger cartridge filter array can be similar and/or identical to the cartridge filters 30 shown in FIG. 2 or can have some difference (e.g., different size, shape, or the like).

The cartridge filters 30 extend substantially horizontally within the filter section 18 and can be arranged in a vertically aligned orientation (i.e., one cartridge filter directly above another cartridge filter). However, in other examples, the cartridge filters 30 can be arranged in a vertically offset (e.g., staggered) position, such that a cartridge filter 30 is not positioned directly above or below an adjacent cartridge filter. Similarly, the filter array may have the cartridge filters 30 arranged in a laterally aligned orientation (i.e., one cartridge filter along a lateral line from another cartridge filter). However, in other examples, the cartridge filters 30 can be arranged in a lateral offset (e.g., staggered) position, such that a cartridge filter 30 is not positioned laterally aligned relative to an adjacent cartridge filter. Spacing between adjacent cartridge filters 30 can be uniform or non-uniform. In one example, the array of cartridge filters 30 is positioned adjacent one wall (e.g., the bottom wall) of the filter section 18 and extends towards another wall (e.g., the top wall) of the filter section 18.

Each cartridge filter 30 filters the fluid flow 13 as it passes through the cartridge filter 30. Each cartridge filter 30 is attached to the partition 22 at one end and extend along a longitudinal elongated axis 36 (shown in FIG. 2) in a direction away from the partition 22. Each cartridge filter 30 can define an elongated substantially cylindrically shaped structure. In one example, each cartridge filter 30 can be formed as a single piece structure or, as shown, a multiple piece structure. In one possible example, each cartridge filter 30 includes a conically shaped section 34 and a cylindrically shaped section 38. The conically shaped section 34 can be attached at one end to the partition 22 to surround the aperture 23 (shown only in phantom in FIG. 2 as the aperture 23 is not normally visible in such a view). The cylindrically shaped section 38 can be attached to the conically shaped section 34 opposite from the partition 22. Of course, it is to be appreciated that the cartridge filters 30 could include a number of different examples and embodiments, and FIG. 2 merely depicts one possible example.

Each cartridge filter 30 includes a filter media 40 arranged circumferentially around each of the conically shaped section 34 and cylindrically shaped section 38. The filter media includes any number of different materials that can filter fluid flow (i.e., remove particulates from air passing through the filter media 40), such as a hydrophobic media, such as polytetrafluoroethylene (PTFE) or expanded polytetrafluoroethylene (ePTFE) or a non-hydrophobic media having a layer or coating of hydrophobic media deposited on a surface of the filter media.

The cartridge filter 30 can filter the air flow and limit particles in the air flow from passing through the filter media 40. In one example, the cartridge filter 30 includes a pulse cartridge filter. In this example, particles can build up on the surface of the filter media 40 of the pulse cartridge filter. When a pressure loss of the pulse cartridge filter is too high, such as due to the particle buildup, a pulse of air can be provided to dislodge some or all of the particle buildup. This pulse of air can be provided by a tube, pulse nozzle, or the like that is positioned at a location behind the cartridge filters 30, such as downstream from the cartridge filters 30). This pulse of air can reduce the pressure loss and extend the life of the pulse cartridge filters.

In a further example, the cartridge filter 30 can include a static cartridge filter. As such, the static cartridge filter can be similar or identical to the pulse cartridge filter. In one example, the static cartridge filter can include the filter media 40, but can include a different material than the material used in the cartridge filter 30. In such an example, the static cartridge filter can include a different material because the static cartridge filer may not use the pulse of air to dislodge particles. The static cartridge filter can be used in less dusty atmospheres than the cartridge filter 30.

The cartridge filters 30, including both the pulse cartridge filters and static cartridge filters, can each include a support structure 50 (generic example shown in FIG. 1) for supporting the cartridge filters 30. The support structure 50 is attached to the partition 22 and can be positioned to extend longitudinally within the cartridge filters 30. The support structure 50 provides internal support for the conically shaped section 34 and cylindrically shaped section 38. In one example, the support structure 50 includes one or more (e.g., three) support legs, such that the support structure 50 has a tripod-like structure. The support structure 50 could include any number of shapes and sizes in further examples. It is to be appreciated that the cartridge filter 30 can include both the pulse filter element (such as the filter media 40) and the support structure 50. Similarly, the static cartridge filter can also include both the static filter element and the support structure 50.

The support structure 50 is attached to the partition 22 at one end and extends longitudinally along the elongated axis 36 away from the partition 22. The support structure 50 is sufficiently rigid such that it can support the weight of at least a cartridge filter 30 and pre-filters. It is to be appreciated that the support structure 50 is somewhat generically/schematically depicted in FIG. 1, and is not limited to such a construction. Indeed, only the bottom-most cartridge filter is shown with the support structure 50 for illustrative purposes. However, it is to be appreciated that each of the cartridge filters 30 includes a support structure that is similar or identical to the support structure 50 shown at the bottom of the chamber 19.

As shown in FIG. 2, the support structure 50 can further include a support shaft 52. The support shaft 52 is disposed at an end of the support structure 50 opposite from the partition 22 and can either be integrally formed with the support structure 50 or can be attached as a separate piece. While the support shaft 52 is shown to extend substantially coaxially with the cartridge filter 30 along the elongated axis 36, the support shaft 52 could be off-center with respect to the cartridge filter 30 in further examples. The support shaft 52 is substantially straight, though a number of sizes, shapes, and orientations are contemplated. For example, the support shaft 52 can be longer or shorter than in the shown examples. Similarly, the support shaft 52 could have a larger or smaller diameter than as shown. In further examples, the support shaft 52 is not limited to having a circular cross-sectional shape, and may have other shapes instead, such as quadrilateral shapes, or the like. Even further, the support shaft 52 could include one or more bends, curves, or the like. As such, the support shaft 52 shown herein comprises merely one possible example of the support shaft 52, as a number of different embodiments are envisioned. The support shaft 52 could also include a longer length so as to support one or more structures in an end to end orientation along the support shaft 52.

The support shaft 52 can extend through an end of the cartridge filter 30. In one example, the support shaft 52 extends from an interior portion of the cartridge filter 30 through an end of the cartridge filter 30, and to an exterior portion. In such an example, the support shaft 52 can extend through an end cap, or the like, disposed at an end of the cartridge filter 30. The support shaft 52 can include a number of materials that are substantially rigid and/or inflexible, such as metals, plastics, combinations thereof, etc. As such, the support shaft 52 can support a predetermined weight and can be limited from buckling and/or flexing. In further examples, the support shaft 52 includes a threaded portion such that the support shaft 52 is sized to receive a nut, washer, or the like in a threading engagement attachment.

The filter arrangement 20 further includes the pre-filter 32. The pre-filter 32 can function to capture and/or coalesce fluid droplets from the fluid flow 13. For example, the pre-filter 32 can remove water, oil, and/or particulates from the fluid flow 13. The pre-filter 32 can also capture aerosol droplets and cause them to coalesce into larger droplets. These larger droplets are drained off as liquid. In further examples, the pre-filter 32 can remove dust, dry salt particles, salt aerosol droplets or the like from the fluid flow 13 as it passes through the pre-filter 32. Of course, it is to be understood that the pre-filter 32 can remove any number of materials from the fluid flow 13 depending on the type of material used in the pre-filter 32. For example, the pre-filter 32 can function as a pre-filter and can capture and/or remove solid coarse particulates having sufficiently large diameters from the fluid flow 13 prior to reaching the cartridge filters 30. The cartridge filters 30 can subsequently filter finer particulates having a smaller diameter. In one example, the pre-filter 32 can include a fiberglass filtering material, though nearly any type of filtering material is envisioned.

The pre-filter 32 can have a lower efficiency than the cartridge filters 30, which includes either or both of the pulse cartridge filters or static cartridge filters. For instance, the pre-filter 32 can remove larger particles, such as dust, from the air flow prior to the air flow reaching the cartridge filters 30. The pre-filters 32 can be less expensive than the cartridge filters 30, such that the pre-filters 32 can be replaced more frequently. The pre-filter 32 can also act as a coalescer, and can capture and agglomerate small water droplets in order to produce larger water droplets. In some examples, the pre-filter 32 is also a coalesce, such that the pre-filter 32 is a relatively low-efficiency filter that can coalesce water.

Figure 4:
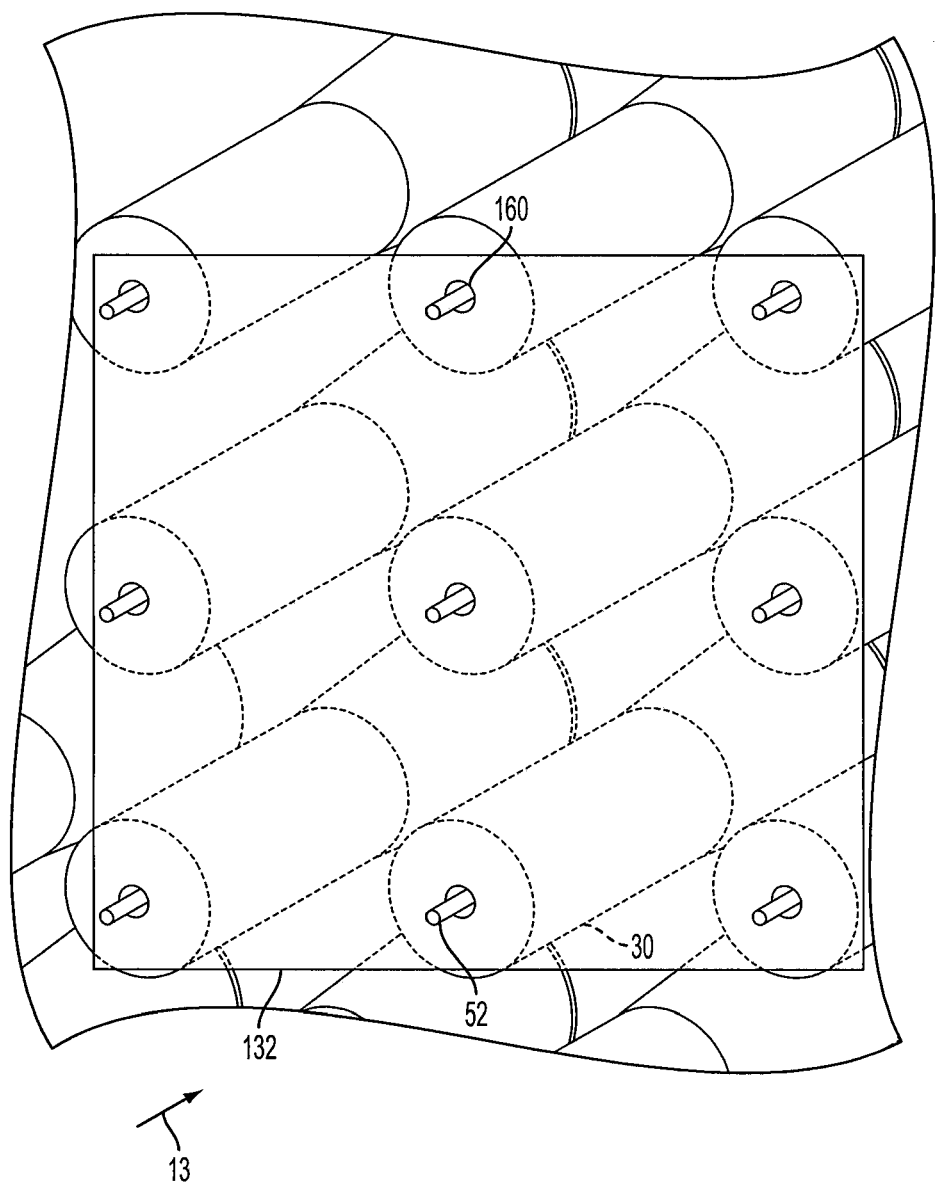
FIG. 4 is a perspective view of a portion of another example filter arrangement showing a second example pre-filter in accordance with an aspect of the present invention.

The pre-filter 32 is somewhat generically depicted in FIG. 2, as it is to be appreciated that the pre-filter 32 could include any number of sizes, shapes, and constructions. For example, the pre-filter 32 can extend along a substantially flat plane in a direction transverse to a direction of the fluid flow 13. A plurality of pre-filters 32 can be provided to extend across substantially the entire cross-sectional area of the filter section 18 (as shown in FIG. 1). Indeed, while FIGS. 2 and 4 show only one pre-filter for illustrative purposes, it is to be understood that in operation, a plurality of pre-filters would be provided to extend across the cross-sectional area of the filter section 18 to achieve a more complete filtering of the fluid flow 13. In one example, the pre-filter 32 is oriented to extend along a substantially vertical direction (i.e., up and down) such that water, liquids, particulates, or the like can naturally drain from the pre-filter 32 under the force of gravity. Of course, the pre-filter 32 need not be perfectly planar, and could include undulations, bends, curves, or the like while still retaining a similar filtering function. Similarly, the pre-filter 32 need not extend in a vertical direction and, in other examples, could be arranged to extend at an angle with respect to vertical.

The pre-filter 32 can have a generally quadrilateral shape (e.g., rectangular shape in FIG. 2) though a number of different shapes and sizes are envisioned. For example, the pre-filter 32 can include other quadrilateral shapes, such as squares or the like, or can include non-quadrilateral shapes, such as an oval shape, circular shape, shapes having rounded corners, etc. In further examples, the pre-filter 32 can be larger or smaller than the example shown in FIG. 2. For instance, in one example, the pre-filter 32 can include a width of about 300 millimeters (11.8 inches) though the pre-filter 32 could also be larger, such as by having a width of about 2 meters (78.7 inches).

Figure 3:
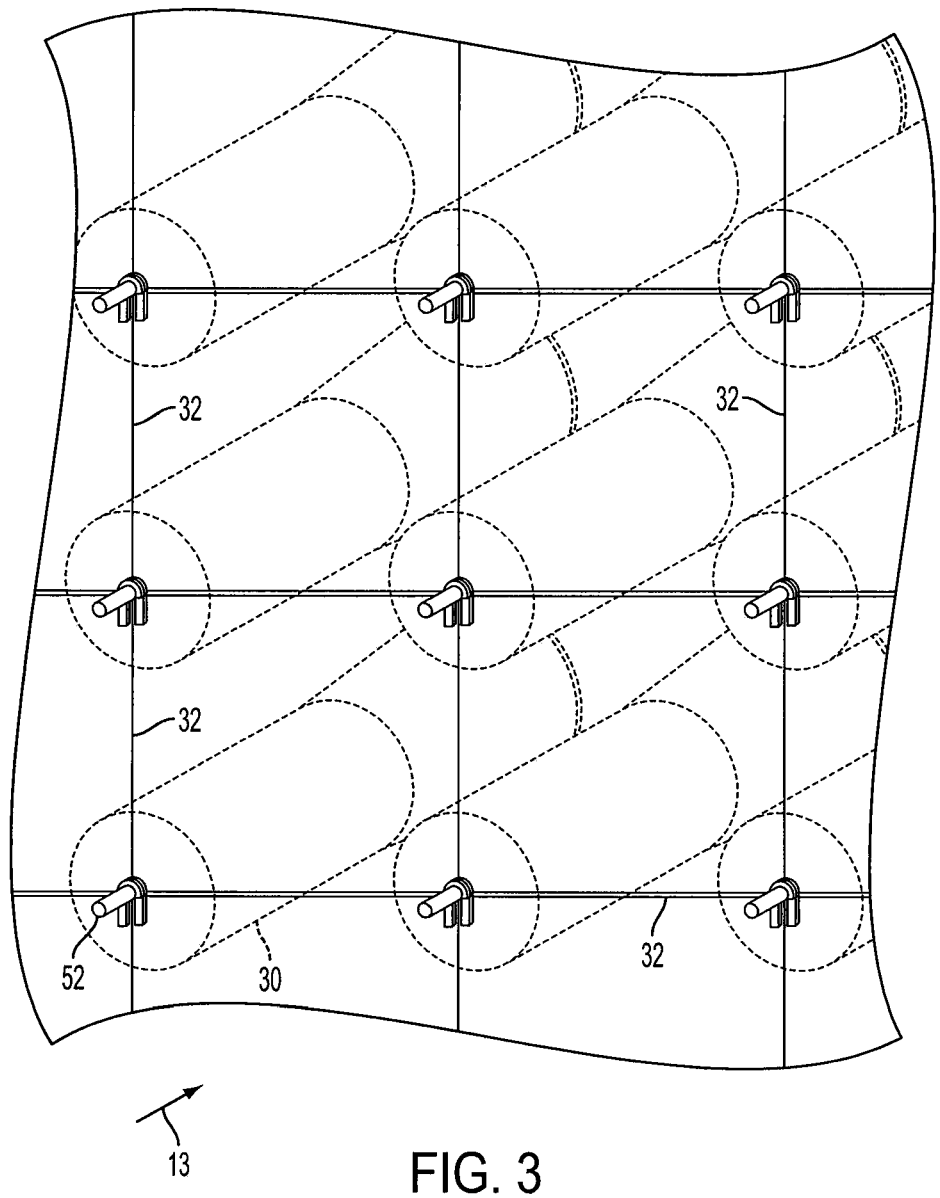
FIG. 3 is a view similar to FIG. 2, but with a plurality of pre-filters.

Referring briefly to FIG. 4, an example of a second pre-filter 132 can have a larger size than the pre-filter 32 shown in FIGS. 2 and 3. In this example, the second pre-filter 132 can include a larger length and width than the example pre-filters 32. The second pre-filter 132 can include a length and width that is sufficient to at least match the spacing between the support shafts 52 of three neighboring cartridge filters 30. For example, the second pre-filter 132 can have a width and length that are each larger than a distance between three cartridge filters 30 (i.e., distance from a first cartridge filter 30 to a neighboring second cartridge filter plus a distance from the second cartridge filter to a neighboring third cartridge filter). As such, the second pre-filter 132 can cover a total of nine cartridge filters, with three rows and three columns of cartridge filters. It is to be appreciated that the second pre-filter 132 is not limited to such a size, and could be even larger, such as, for example, encompassing sixteen cartridge filters, with four rows and four columns of cartridge filters. In further examples, the second pre-filter 132 need not be limited to having an equal length and width, and could include a longer length or a longer width, such that the second pre-filter 132 can include a rectangular shape, or the like.

Referring back to FIG. 2, the pre-filter 32 further includes a pre-filter supporting means 60 that attaches the pre-filter 32 to the cartridge filters 30. In one example, the pre-filter supporting means 60 can attach the pre-filter 32 to the support shaft 52. It is to be appreciated that the pre-filter supporting means 60 is not limited to permanently attaching the pre-filter 32 to the support shaft 52 and, instead, could provide removable attachment as well. The pre-filter supporting means 60 can be provided at each of the corners of the pre-filter 32, as shown in FIG. 2. As such, in addition to providing an attachment function for the pre-filters 32, the pre-filter supporting means 60 can further maintain the pre-filters 32 in a stretched state transverse to a direction of the fluid flow 13. It is to be understood, however, that in other examples, the pre-filter 32 need not have pre-filter supporting means 60 at each of the corners. Rather, as shown in FIG. 3, the pre-filter supporting means 60 may be positioned only at the upper corners of the pre-filter 32, such that the pre-filter 32 can hang naturally under the force of gravity. In such an example, the pre-filters 32 may have a sufficient weight/mass so as to remain in the stretched state even while filtering the fluid flow 13.

As shown in FIG. 2, the pre-filter supporting means 60 can include a hook structure 62. In this example, the pre-filter supporting means 60 is attached to the pre-filter 32 at one end, while the hook structure 62 is disposed at an opposing end. The hook structure 62 can be sized and shaped to receive the support shaft 52. For example, the hook structure 62 includes an inner diameter that is slightly larger than a cross-sectional width (i.e., diameter in the shown example) of the support shaft 52, such that the hook structure 62 receives the support shaft 52. Of course, the hook structure 62 could be larger or smaller in size than as shown.

The hook structure 62 can include an inverted "J" shape (i.e., upside down "J"). For example, each of the four hook structure 62 includes the inverted "J" orientation, with each of the hook structures facing outwardly away from the pre-filter 32. Of course, it is to be appreciated that the pre-filter supporting means 60 is not limited to the inverted "J" orientation, and could include a number of different orientations. In a further example, the hook structure 62 at an upper surface of the pre-filter 32 can include the inverted "J" orientation while the hook structure 62 at a lower surface could include an upright "J" orientation (i.e., opposite orientation from the lower surface in FIG. 2). In such an example, the pre-filter supporting means 60 at the upper and lower surfaces and function to hold the pre-filter 32 in the stretched orientation. In further examples, some or all of the hook structures 62 can face inwardly towards the pre-filter 32 (i.e., opposite orientation from what is shown in FIG. 2).

It is to be appreciated that the pre-filter supporting means 60 shown in FIG. 2 is merely one possible example of the pre-filter supporting means that functions to attach the pre-filter 32 to the support shaft 52. Indeed, the pre-filter supporting means includes any number of different attachment structures that perform a similar function. For instance, as shown in FIG. 4, the second pre-filter 132 is shown with a different supporting means. In this example, the second pre-filter 132 can include a pre-filter supporting means comprising one or more apertures 160. The apertures can extend through the second pre-filter 132 from one side to an opposing second side. The apertures 160 can be positioned at a number of locations within the second pre-filter 132, such as towards the corners and/or towards a center portion of the second pre-filter 132. In this particular example, the apertures 160 are spaced apart from each other along a top surface, bottom surface, and side surfaces of the second pre-filter 132. For further support, an aperture 160 is also positioned at a center of the second pre-filter 132. The apertures 160 can be positioned a distance from an outer edge of the pre-filter, such that the apertures 160 are limited from ripping and/or tearing.

The apertures 160 can be spaced a distance away from each other, such that each of the apertures 160 are sized and shaped to receive the support shafts 52. In a further example, the support shafts 52 could also be threaded, such that the support shafts 52 can receive a threaded nut, and possibly an associated fender-type washer, so as to securely attach the second pre-filter 132 to the cartridge filters 30. In operation, the support shafts 52 can be sized to receive a plurality of apertures 160 from a plurality of pre-filters. As such, it is to be understood that while only a single pre-filter is shown in FIG. 4, in operation, the pre-filters may at least partially overlap to extend across the filter section 18 with one or more apertures 160 being positioned on each of the support shafts 52.

Figure 5:
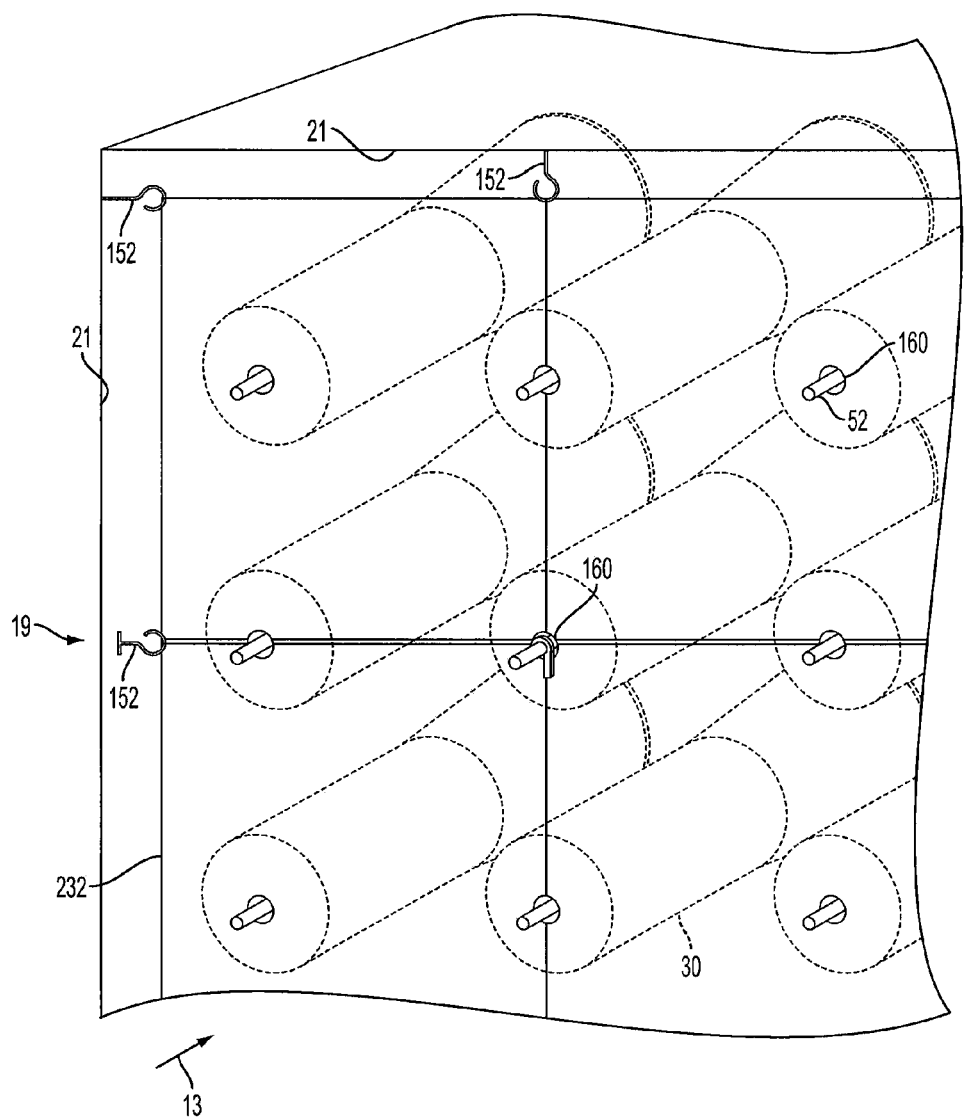
FIG. 5 is a perspective view of yet another example filter arrangement showing yet another example pre-filter in attachment with walls of an example inlet system.

Referring now to FIG. 5, the pre-filter supporting means 60 is not limited to the attachment structures (e.g., hook structure 62, apertures 160, etc.) described herein, and could include other attachment structures. For example, the pre-filter supporting means 60 may include a combination of attachment structures, such as by having both hook structures 62 and apertures 160. In yet another example, the pre-filter supporting means 60 could include a hook and loop fastener (not shown). For instance, either of the pre-filter 32 or the end cap of the cartridge filters 30 can include a piece of hook material while the other of the pre-filter 32 or end cap of the cartridge filters 30 could include a piece of the loop material. As such, the pre-filter 32 can be removably attached to the cartridge filters 30 via the engagement of the hook and loop materials. In such an example, the hook and loop fastener allows for the pre-filter 32 to be selectively attached or detached from the cartridge filters 30. In yet another example, the pre-filter supporting means 60 can include adhesives for attaching the pre-filter 32 to the cartridge filters 30. Accordingly, it is to be appreciated that the pre-filter supporting means 60 can include a number of different structures that allow the pre-filters 32 to be removably supported by the cartridge filters 30, such that the pre-filter supporting means are not limited to the examples shown and described herein.

Referring still to FIG. 5, the pre-filters can further include an attachment means 152 for attaching the pre-filters 232 to the walls 21 of chamber 19 of the filter section 18. The attachment means 152 can include any number of structures that allow for attachment of the pre-filters 232 to the walls 21. In one example, the attachment means 152 each comprise a hook structure (as shown in FIG. 5). In such an example, the hook structure can be attached at one end to the wall 21 and can include a hook-like portion at an opposing end. The hook-like portion can be sized to be received by apertures, openings, or the like in the third pre-filter 232. Accordingly, the attachment means 152 can function to attach the third pre-filter 232 to walls 21 of the filter section 18 and can reduce the size of a gap between an edge of the pre-filter and the wall 21. By having a reduced gap size, more fluid flow 13 can be filtered by flowing through the pre-filters while reducing the amount of fluid flow that passes through the gap.

It is to be appreciated that the attachment means 152 for attaching the third pre-filter 232 to the walls 21 in FIG. 5 comprises merely one possible example of attachment means. Indeed, in further examples, the attachment means is not limited to the attachment means 152 having a hook portion. Instead, the attachment means could include any number of structures that function to attach the pre-filters to the walls 21. For example, the attachment means can include a hook and loop fastener, a number of different mechanical fasteners, adhesives, or the like. The attachment means 152 can be provided to attach any of the pre-filters shown or described herein (e.g., pre-filter 32, second pre-filter 132, third pre-filter 232) to walls 21 of the filter section 18. Moreover, while FIG. 5 only depicts three attachment means 152, it is to be appreciated that any number of attachment means could be provided. For example, the attachment means 152 can be provided to encircle substantially the entire filter section, such that the attachment means 152 can be placed on top walls, bottom walls, side walls, etc.

As can be appreciated, an associated method of providing a filter arrangement for filtering fluid flow in a turbine inlet system is an aspect of the present invention. In general terms, the method includes positioning at least one cartridge filter within a filter section of the inlet system. The method also includes supporting a pre-filter, which filters the fluid flow, upon the cartridge filter. Variations to the method, including specifics within the general methodology, are contemplated and within the scope of the invention.

In view of the discussions of various possible example embodiments and method of providing such, the operation of the filter arrangement 20 can now be described. Fluid flow 13, such as air flow, can initially enter the turbine inlet system 10 and flow past the hoods 16. After exiting the inlet section 14, the fluid flow 13 can enter the filter section 18. A majority of the fluid flow 13 in the filter section 18 can first pass through the pre-filters 32, and a small amount may bypass the pre-filters 32 (e.g., flowing through the gap between edges of the pre-filters 32 and the walls 21, flowing through gaps between adjacent pre-filters, etc.). The fluid flow 13 that flows through the pre-filters 32 can be coalesced by the pre-filters 32. In particular, the pre-filters 32 can capture and/or coalesce droplets from the fluid flow and remove water, oil, and/or particulates. After passing through the pre-filters 32, the fluid flow 13 can then be filtered by the cartridge filters 30. The cartridge filters 30 can function to remove smaller and/or finer particulates from the fluid flow 13 that were not removed by the pre-filters 32. Once the fluid flow 13 passes through the cartridge filters 30, the fluid flow 13 can flow through the remainder of the turbine inlet system 10 and exit through the outlet 25 as the exiting fluid flow 26.

The pre-filters 32 can be relatively easily removed and/or replaced. For example, the pre-filters 32 can be removed from the support shafts 52 such as by sliding the pre-filters 32 along the elongated axis 36 in a direction away from the cartridge filters 30. The pre-filters 32 can then be replaced or serviced, such as by cleaning, or the like, and can be replaced back on the support shafts 52. Such removal and/or replacement can be considered to be part of the method of providing the filter arrangement and/or operating the filter arrangement.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A filter arrangement for filtering fluid flow in a turbine inlet system, the filter arrangement including:
   a cartridge filter positioned within a filter section of the inlet system; and
   a pre-filter for filtering and/or coalescing the fluid flow, the pre-filter separate from the cartridge filter with both the pre-filter and cartridge filter coupled to a support shaft structure attached to a partition disposed in the filter section.

2. The filter arrangement of claim 1, wherein, the support shaft structure and cartridge filter extending along an elongated axis.

3. The filter arrangement of claim 2, wherein the pre-filter extends in a direction that is substantially transverse to the elongated axis of the cartridge filter.

4. The filter arrangement of claim 2, wherein the pre-filter extends in a direction that is substantially transverse to a direction of the fluid flow.

5. The filter arrangement of claim 2, wherein the support shaft extends from an end of the cartridge filter.

6. The filter arrangement of claim 5, wherein the pre-filter includes a pre-filter supporting means for supporting the pre-filter on the support shaft.

7. The filter arrangement of claim 6, wherein the pre-filter supporting means includes a hook structure.

8. The filter arrangement of claim 6, wherein the pre-filter supporting means includes a plurality of apertures extending through the pre-filter, the apertures each being sized to receive the support shaft of the support structure for supporting the pre-filter.

9. The filter arrangement of claim 1, wherein the pre-filter includes an attachment means for attaching the pre-filter to at least one wall of the turbine inlet system.

10. The filter arrangement of claim 1, wherein the cartridge filter includes one of a pulse cartridge filter or a static cartridge filter.

11. A filter arrangement for filtering fluid flow in a turbine inlet system, the filter arrangement including:
    a cartridge filter mounted on a support structure the support structure is coupled to a partition disposed in a chamber of the turbine inlet system; and
    a pre-filter for filtering and/or coalescing the fluid flow, further wherein the support structure includes a support shaft extending from an end of the cartridge filter, the support shaft being configured to engage and support the pre-filter.

12. The filter arrangement of claim 11, wherein the cartridge filter includes one of a pulse cartridge filter or a static cartridge filter.

13. The filter arrangement of claim 11, wherein the support structure extends substantially coaxially with the cartridge filter, the support structure extending within the cartridge filter.

14. The filter arrangement of claim 11, wherein the pre-filter includes an attachment means for attaching the pre-filter to at least one wall of the turbine inlet system.

15. The filter arrangement of claim 11, wherein the pre-filter includes a plurality of pre-filters arranged in an end to end orientation, the plurality of pre-filters being configured to extend across a cross-sectional area of the turbine inlet system in a direction transverse to the fluid flow.

16. The filter arrangement of claim 11, wherein the fluid flow includes air flow passing through the turbine inlet system.

17. A method of providing a filter arrangement for filtering fluid flow in a turbine inlet system, the method including:
    positioning a cartridge filter within a filter section of the inlet system; and
    supporting a pre-filter, which filters the fluid flow, upon a support shaft coupled to the cartridge filter.

18. The method of claim 17, wherein the cartridge filter is one of a plurality of cartridge filters and the pre-filter is one of a plurality of pre-filters, the method includes supporting the pre-filters upon the cartridge filters and arranging the pre-filters in an end to end orientation such that the pre-filters extending across a cross-sectional area of the turbine inlet system in a direction transverse to the fluid flow.

19. The method of claim 18, wherein for the plurality of cartridge filters each cartridge filter extends along a separate elongated axis.

20. The method of claim 19, further including removably attaching a corner of each of the pre-filters to one of the cartridge filters.

* * * * *